US012665316B2

(12) United States Patent (10) Patent No.: US 12,665,316 B2
Kocharyan et al. (45) Date of Patent: Jun. 23, 2026

(54) AUTOMOTIVE SENSOR MODULE WITH ABSORPTIVE AND/OR NON-REFLECTIVE LAYER

(71) Applicant: Magna Electronics, LLC, Southfield, MI (US)

(72) Inventors: Karen Kocharyan, Lowell, MA (US); Andrew T. Oftedal, North Andover, MA (US); Jonathan Moss, Unterschleissheim (DE); Stephen R. Blatt, Bedford, NH (US); Matthias Reinlein, Dettelbach (DE); Robert J. Sletten, Bow, NH (US)

(73) Assignee: Magna Electronics, LLC, Southfield, MI (US)

( * ) Notice: Subject to any disclaimer, the term of this patent is extended or adjusted under 35 U.S.C. 154(b) by 398 days.

(21) Appl. No.: 18/085,512

(22) Filed: Dec. 20, 2022

(65) Prior Publication Data

US 2024/0204416 A1 Jun. 20, 2024

(51) Int. Cl.
    *H01Q 17/00* (2006.01)
    *G01S 7/02* (2006.01)
    *H01Q 1/42* (2006.01)
(52) U.S. Cl.
    CPC ........... *H01Q 17/007* (2013.01); *G01S 7/028* (2021.05); *H01Q 1/42* (2013.01)
(58) Field of Classification Search
    CPC ........ H01Q 17/007; H01Q 1/42; H01Q 1/422; H01Q 1/523; H01Q 21/005; H01Q 1/3233; G01S 7/028; G01S 7/027; G01S 13/931
    See application file for complete search history.

(56) References Cited

U.S. PATENT DOCUMENTS 3,518,688 A    6/1970  Stayboldt et al.
4,517,571 A    5/1985  Mulliner et al.
                (Continued)

FOREIGN PATENT DOCUMENTS

DE    19961387    6/2001
EP    2343774     7/2011
                (Continued)

OTHER PUBLICATIONS

Sundar U, Lao Z, Cook-Chennault K. Enhanced Dielectric Permittivity of Optimized Surface Modified of Barium Titanate Nanocomposites. Polymers (Basel). Apr. 5, 2020 (Year: 2020).*
                (Continued)

*Primary Examiner* — Vladimir Magloire
*Assistant Examiner* — Anna K. Gosling
(74) *Attorney, Agent, or Firm* — Matthew D. Thayne; Thayne and Davis LLC

(57) ABSTRACT

Antenna assemblies for vehicles, such as RADAR sensor antenna assemblies. In some embodiments, the assembly may comprise a waveguide block defining an array of waveguide grooves and an array of antenna slots. Each antenna slot in the array of antenna slots may be at least partially aligned with a waveguide groove of the array of waveguide grooves of the waveguide block. The assembly may further comprise an absorptive layer comprising an array of openings corresponding with the array of antenna slots. The absorptive layer may be configured to dissipate surface currents on the waveguide block such as, for example, by way of the material used to form the absorptive layer and/or the thickness of the absorptive layer and/or to suppress fascia reflections.

17 Claims, 6 Drawing Sheets

(56)     References Cited

U.S. PATENT DOCUMENTS

| | | | |
|---|---|---|---|
| 8,779,995 | B2 | 7/2014 | Kirino et al. |
| 9,806,431 | B1 | 10/2017 | Izadian |
| 9,997,842 | B2 | 6/2018 | Kirino et al. |
| 10,535,919 | B2 * | 1/2020 | Linn ..................... H01Q 21/061 |
| 11,145,988 | B2 * | 10/2021 | Ukei ...................... H01Q 17/00 |
| 11,619,734 | B2 * | 4/2023 | Izadian ................ H01Q 1/3233 |
| | | | 342/25 R |
| 2005/0105075 | A1 * | 5/2005 | Gottwald ................ G01S 7/032 |
| | | | 356/28 |
| 2006/0132374 | A1 | 6/2006 | Wang |
| 2012/0119932 | A1 | 5/2012 | MacDonald et al. |
| 2013/0113665 | A1 | 5/2013 | Burg et al. |
| 2014/0111392 | A1 | 4/2014 | Ou |
| 2015/0222021 | A1 | 8/2015 | Stevenson et al. |
| 2015/0222023 | A1 | 8/2015 | Shijo et al. |
| 2015/0349414 | A1 | 12/2015 | Tagi |
| 2017/0149124 | A1 | 5/2017 | Fabre et al. |
| 2017/0187121 | A1 | 6/2017 | Kirino et al. |
| 2017/0187124 | A1 * | 6/2017 | Kirino .................. H01Q 1/3266 |
| 2017/0237177 | A1 | 8/2017 | Kirino et al. |
| 2018/0013208 | A1 | 1/2018 | Izadian et al. |
| 2018/0301820 | A1 | 10/2018 | Bregman et al. |
| 2018/0351261 | A1 | 12/2018 | Karno et al. |
| 2021/0247512 | A1 * | 8/2021 | Alexanian ............... G01S 7/027 |
| 2022/0013885 | A1 | 1/2022 | Yang et al. |
| 2022/0278458 | A1 | 9/2022 | Alexanian et al. |
| 2023/0039021 | A1 * | 2/2023 | Vollbracht ........... H01Q 1/3233 |
| 2024/0243465 | A1 * | 7/2024 | Kowalewski ........... G01S 7/032 |

FOREIGN PATENT DOCUMENTS

| | | |
|---|---|---|
| EP | 2677594 | 12/2013 |
| EP | 2945222 | 11/2015 |
| EP | 3147994 | 3/2017 |
| IN | 201717024455 | 10/2017 |
| WO | 1996013074 | 5/1996 |
| WO | 2010003808 | 1/2010 |
| WO | 2013185807 | 12/2013 |
| WO | 2013189919 | 12/2013 |
| WO | 2014090290 | 6/2014 |
| WO | 201867046 | 4/2015 |
| WO | 2015172948 | 11/2015 |
| WO | 201658627 | 4/2016 |
| WO | 2016116126 | 7/2016 |
| WO | 2017078183 | 5/2017 |
| WO | 2018021244 A1 | 1/2018 |

OTHER PUBLICATIONS

Jan. 27, 2020 PCT/US19/050478 International Search Report (2 pgs).

Jan. 27, 2020 PCT/US19/050478 Written Opinion (8 pgs).

WO2018021244a1, Jan. 1, 2018, Denso Corporation, Machine Translation, (12 pgs).

Jun. 1, 2022 European Patent Application No. EP 19897684, Supplementary European Search Report (14 pgs).

WO 1996013074, May 2, 1996 , Wilhelm Sihn Jr. Kg, Machine Translation, (9 pgs).

DE 19961387, Jun. 21, 2001, Mannesmann Vdo AG, Machine Translation, (11 pgs).

PCT/US23/81893 Written Opinion and International Search Report, Mar. 13, 2024 (11 pgs).

* cited by examiner

AUTOMOTIVE SENSOR MODULE WITH ABSORPTIVE AND/OR NON-REFLECTIVE LAYER

SUMMARY

Disclosed herein are various embodiments of sensor assemblies and related elements, sub-assemblies, and manufacturing methods. In preferred embodiments and implementations, such assemblies may comprise RADAR sensor modules for vehicles, including one or more novel and inventive features disclosed herein.

For example, in some embodiments disclosed herein, an antenna block, which may comprise a casting, may have features designed to establish the foundation for one or more waveguides and/or antenna slots. For example, an array of one or more waveguide grooves may be formed, with such grooves being formed, for example, by way of opposing rows of posts or trench-style waveguide grooves. Alternatively, a film or other layer, such as a conductive adhesive layer, may be used to couple a conductive sheet comprising antenna slots to the block. It is also possible that the principles disclosed herein may be used in connection with a more conventional patch antenna RADAR module.

The block/assembly may further comprise an absorptive layer configured to suppress surface currents on the block by, for example, absorbing energy from such currents and converting it into heat. This suppression of surface currents between the antennae of a sensor/module may reduce or eliminate intra-antenna crosstalk. In some embodiments, the absorptive layer may also, or alternatively, be useful in neutralizing the detrimental effect of strong reflections originating from vehicle fascia.

A top layer that may comprise an adhesive plastic film in some embodiments, may form a radome or weather seal to the assembly.

In a more specific example of a vehicle sensor module according to some embodiments, the module may comprise a waveguide block defining an array of waveguide grooves and an array of antenna slots. Each antenna slot in the array of antenna slots may be aligned, or at least partially aligned, with a waveguide groove of the array of waveguide grooves of the waveguide block. In some embodiments, each antenna slot of the array of antenna slots may extend from a first side and/or surface of the antenna block to a second side and/or surface of the waveguide block to allow electromagnetic radiation to travel through the array of antenna slots. The module may further comprise an absorptive layer, which, in some embodiments may comprise an array of openings corresponding with the array of antenna slots. The absorptive layer may be configured to suppress surface currents on the waveguide block.

Some embodiments may further comprise a radome layer positioned on top of the absorptive layer, which radome layer may, in some such embodiments, lack openings so as to provide a weather and/or liquid seal for the waveguide block. In some such embodiments, the radome layer may comprise a laminated layer comprising a plurality of sublayers. For example, in some embodiments, at least one of the sub-layers may be configured to adhere the radome layer to the absorptive layer and/or at least one of the sub-layers may be configured to increase a strength of the radome layer.

In some embodiments, the array of waveguide grooves may comprise a plurality of waveguide grooves.

In some embodiments, the absorptive layer may have a thickness equal to an odd integer multiple of one-quarter of a wavelength of electromagnetic radiation used in the vehicle sensor module, or equal to about an odd integer multiple of one-quarter of a wavelength of electromagnetic radiation used in the vehicle sensor module.

In some embodiments, the absorptive layer may comprise a lossy material. For example, the absorptive layer may comprise a material having a dielectric constant of between 6 and 9 and a dielectric loss tangent of between 0.3 and 0.6. In some embodiments, the absorptive layer may comprise a material having a dielectric constant of between about 9 and about 14 and/or may comprise a dielectric loss tangent of between about 0.2 and about 0.3.

In some embodiments, the module may alternatively comprise a slotted layer comprising a plurality of slots that may be at least partially aligned with the waveguide grooves of the waveguide block.

In some embodiments, one or more of the antenna slots (in some cases, all of the antenna slots) may be positioned on raised islands comprising elevated walls extending above a recessed region. In some such embodiments, the absorptive layer may be positioned within the recessed region.

Some embodiments may further comprise a raised lip extending about a perimeter of the waveguide block and/or a radome layer positioned above the absorptive layer. In some embodiments comprising a radome layer and a recessed region, the radome layer may be positioned within the recessed region and/or slightly below the raised lip.

In a specific example of a vehicle sensor antenna assembly according to some embodiments, the assembly may comprise a metallic waveguide block defining an array of waveguide grooves and an antenna assembly comprising at least one antenna slot configured to receive electromagnetic radiation from the array of waveguide grooves therethrough. The assembly may further comprise an absorptive layer, which may be configured to generate a destructive interference pattern to reduce reflectivity of the electromagnetic radiation incident upon the vehicle sensor antenna assembly.

In some embodiments, the antenna assembly may comprise an antenna slot corresponding to each waveguide groove of the array of waveguide grooves.

In some embodiments, the absorptive layer may comprise one or more openings positioned such that each antenna slot of the at least one antenna slot is positioned below an opening of the one or more openings. In some such embodiments, the absorptive layer may comprise one or more openings configured to accommodate multiple antenna slots, such as an array, or multiple arrays, of antenna slots.

In some embodiments, the antenna assembly may be part of the metallic waveguide block such that the at least one antenna slot is formed within the metallic waveguide block and extends between opposite sides and/or surfaces of the metallic waveguide block.

In some embodiments, the metallic waveguide block comprises a recessed region, which in some embodiments may be defined by a lip extending about a perimeter of the metallic waveguide block and/or elevated walls extending about the perimeter of each antenna slot (or each array of antenna slots) of the at least one antenna slot. In some embodiments, the absorptive layer may be positioned within the recessed region.

In some embodiments, the recessed region may comprise a height that is more than a thickness of the absorptive layer. In some cases, the recessed region may comprise a height that is more than a thickness of all layers, or all layers other than a top/radome layer, applied to the block.

In some embodiments, the absorptive layer may comprise a dielectric constant of between about 6 and about 14 and/or a dielectric loss tangent of between about 0.2 and about 0.6.

In some such embodiments, the absorptive layer may comprise a dielectric constant of between about 6 and about 9 and/or a dielectric loss tangent of between about 0.3 and about 0.6. In some such embodiments, the absorptive layer may comprise a material having a dielectric constant of between about 9 and about 14 and/or may comprise a dielectric loss tangent of between about 0.2 and about 0.3.

In a specific example of a vehicle RADAR module according to some embodiments, the module may comprise a metallic waveguide block defining one or more waveguide grooves. In some embodiments, the module may further comprise a recessed region, which may be defined by the waveguide block. Some embodiments may comprise one or more antenna slots, one or more, or each, of which may be at least partially aligned with a corresponding waveguide groove of the metallic waveguide block. The antenna slot(s) may extend entirely through the metallic waveguide block from a first side and/or surface of the metallic waveguide block to a second side and/or surface of the metallic waveguide block opposite the first side and/or surface to allow electromagnetic radiation to travel therethrough. Some embodiments may further comprise an absorptive layer, which may be seated in the recessed region for embodiments comprising one. The absorptive layer may comprise a lossy material.

In some embodiments, the absorptive layer may comprise one or more openings, each of which, or a subset of which, may be at least partially aligned with a corresponding antenna slot and/or waveguide groove. In some embodiments, the absorptive layer may be configured to contact the metallic waveguide block to suppress surface currents on the metallic waveguide block. The absorptive layer may further comprise a thickness configured to suppress reflections of the electromagnetic radiation by generating destructive interference between reflections of the electromagnetic radiation above the absorptive layer with reflections of the electromagnetic radiation below the absorptive layer. Some embodiments may further comprise a radome layer configured to provide a weather seal to the vehicle RADAR module.

In some embodiments, the absorptive layer may have a thickness equal to about an odd integer multiple of one-quarter of a wavelength of electromagnetic radiation used in the vehicle RADAR module.

In some embodiments, the absorptive layer may be formed from a liquid, in some cases a liquid poured into and/or cured within the recessed region of the metallic waveguide block, which region may, in some embodiments, be defined by a lip extending about a perimeter of the waveguide block and/or elevated walls extending about the perimeter of one or more antenna slots.

In some embodiments, the absorptive layer may be positioned in contact with an uppermost face of the block, such as a metallic surface of the block in some such embodiments. This configuration may be configured to suppress reflections from vehicle fascia and/or dissipate currents flowing on the surface of the block.

In some embodiments, the waveguide groove(s) may be formed by providing a plurality of adjacent posts that collectively define one or more such grooves. Alternatively, the grooves may be formed by simply forming one or more trenches within a surface of the antenna block. Some embodiments may further comprise a second array of waveguide grooves positioned on a second side of the antenna block opposite the first side.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
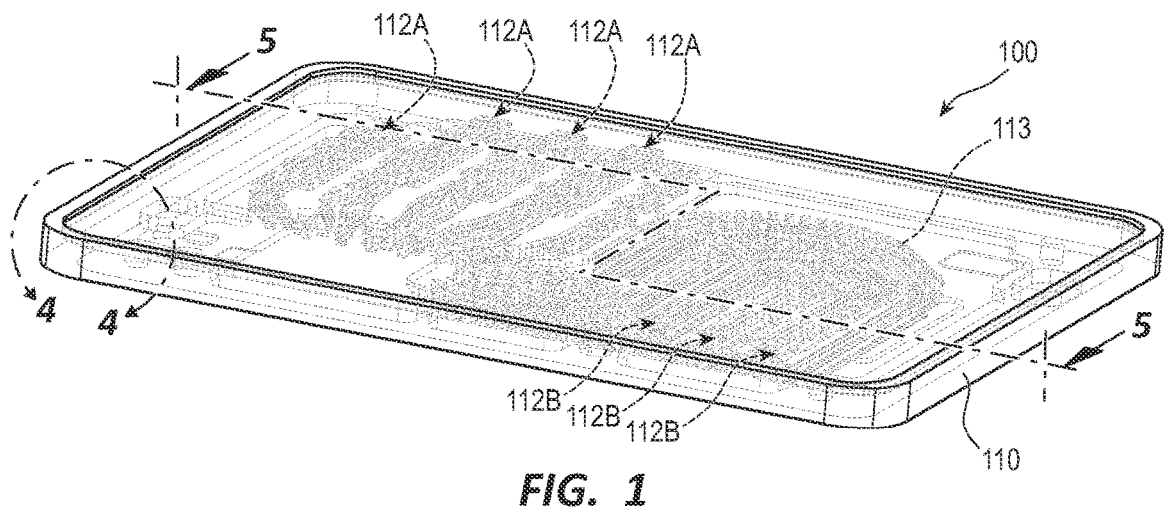
FIG. 1 is a perspective view of an antenna/waveguide assembly that may be incorporated into a more complete antenna module, such as a vehicle RADAR sensor module, according to some embodiments.

FIG. 1 depicts a module 100 for a sensor assembly, such as a RADAR sensor assembly for a vehicle, according to some embodiments. Module 100 comprises a block 110 that may define, either in whole or in part, one or more waveguides and/or one or more antennae. Thus, as depicted in FIG. 1, block 110 comprises a plurality of posts 113 arranged to define a plurality of waveguide grooves therebetween.

More particularly, block 110 comprises two functional sets of waveguides, one an RX section and one a TX section. The RX section comprises a series of waveguide grooves 112A, which, again, are defined by opposing rows of posts 113 but could be defined in any other manner available to those of ordinary skill in the art. Similarly, the TX section comprises a series of waveguide grooves 112B also defined by opposing rows of posts 113.

It should be understood that although, in preferred embodiments, a plurality of antennae may be provided and therefore a plurality of corresponding antennae and/or waveguide structures—such as a plurality of waveguides, grooves, etc.—may be provided, it is contemplated that some embodiments may comprise an array having a single antenna and therefore only a single waveguide, for example. Such antenna/waveguide/groove may curve about the block/assembly rather than be in a series of parallel lines in some embodiments. As another example, in some embodiments, grooves, slots, or the like may be arranged in a disc formation, or any other suitable formation, including linear, curved, etc.

In the depicted embodiment, each of the grooves is defined by a first plurality of posts 113 extending in a row and a second plurality of posts 113 extending in another row that, in some embodiments, may be parallel to the first plurality of posts 113. It should be understood, however, that other grooves and/or antennae, either in the same embodiment or in other embodiments, may not be defined by any posts 113 or other features that are shared in common with other grooves/antennae. It should also be understood that, in some embodiments, the antennae and/or waveguides may be partial antennae/.waveguides. In other words, these antennae may only comprise part of the structure that will ultimately be used to define the full antennae/waveguide structures used in a functional RADAR or other vehicle sensor assembly and yet will be referred to herein as "antennae" nonetheless.

In addition, although not depicted in the drawings, some embodiments may further comprise a waveguide ridge extending through the groove in between the opposing structures, whether posts or trench-like walls, defining the groove. Further, any or all of the waveguide and/or antennae structures discussed herein may be formed or otherwise disposed on both sides of block 110, if desired.

In preferred embodiments, block 110 may comprise a casting, such as a casting comprising a Zinc or other suitable preferably metal material. However, in other contemplated embodiments, block 110 may comprise a plastic or other material. In some such embodiments, metallic inserts, coatings, or the like may be used if desired. In typical sensor assemblies, which, as previously mentioned, may be configured specifically for use in connection with vehicles, other structures may be combined with block/casting 110. For example, as shown in FIG. 2, various additional layers may be coupled to block 110 to form an antenna assembly and/or module 100, as discussed in greater detail below.

In some embodiments, plastic coatings may be used that are electrically conductive. In some such embodiments, the conductive coating(s) may be selectively applied only to certain areas of the antenna module to the exclusion of other areas. For example, conductive coatings may, in some embodiments, be used for the waveguide and/or antenna sections but not for the bulk of the rear of the module. Some embodiments may also, or additionally, comprise two or more different types of coatings. For example, a first coating may be applied that is configured to be favorable for signal propagation in the waveguide and/or antenna sections, and a second coating may be applied that is configured for absorption of radio signals.

Figure 2:
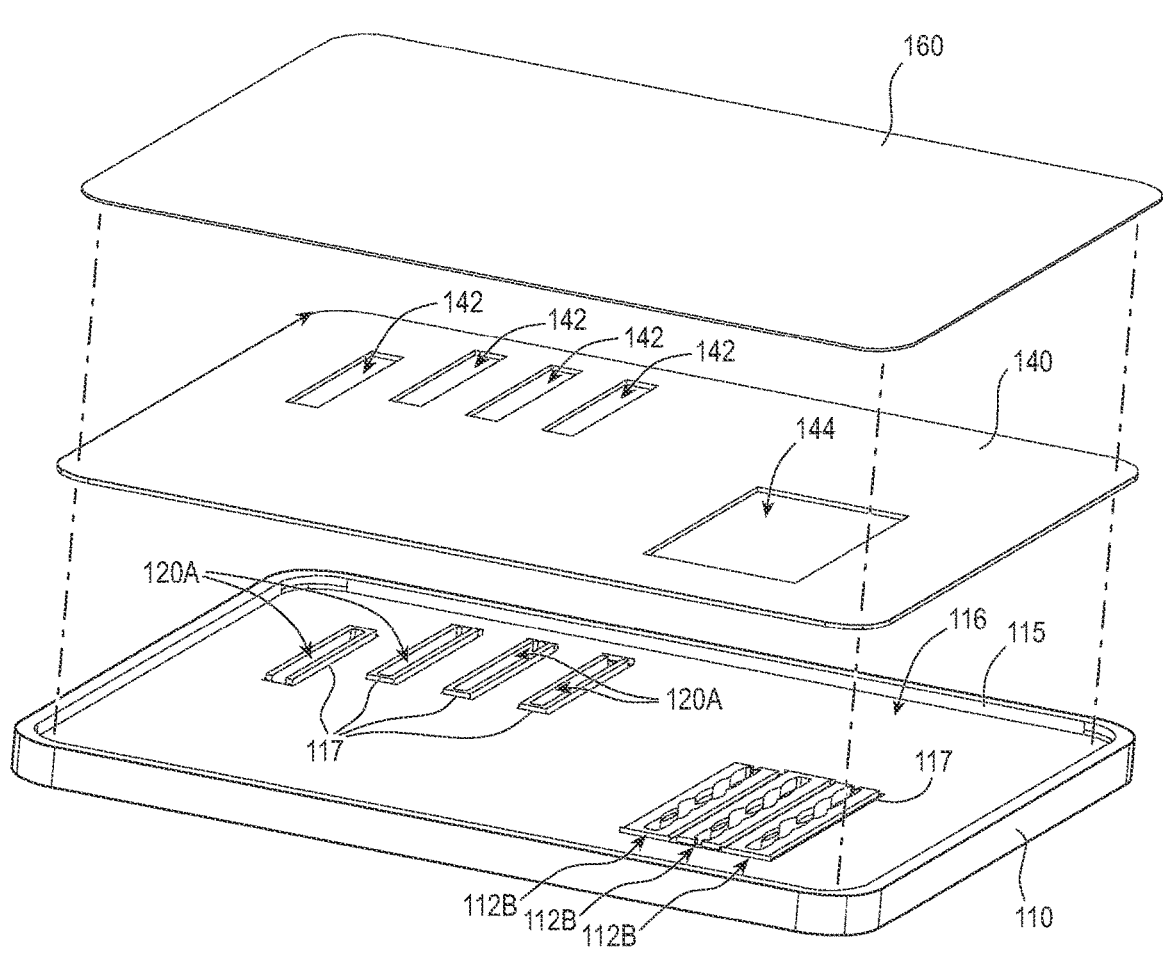
FIG. 2 is an exploded, perspective view of the antenna/waveguide assembly.

FIG. 2 is an exploded view depicting various additional layers that may be provided in some preferred embodiments. However, before describing these layers, consider the antenna slot structures formed on block 110, which in the depicted embodiment are formed on a side/surface of block 110 opposite from the side/surface upon which the aforementioned waveguide structures are formed, although this may vary considerably in various contemplated embodiments.

As shown in FIG. 2, the RX section of block 110 on the surface opposite from the waveguides comprises a series of elongated antenna slots 120A that extend through block 110 and connect with at least a portion of a corresponding waveguide 112A on the opposite side/surface of the block 110. Similarly, the TX section of block 110 on this same surface comprises a series of elongated antenna slots 120B that extend through block 110 and connect with at least a portion of a corresponding waveguide 112B on the opposite side/surface of the block 110.

Antenna slots 120B, however, in the depicted embodiment differ from slots 120A in that they oscillate and further comprise a phase-compensating feature. This may be accomplished by applying one or more angled and/or tapered sections, such as tapered grooves or cutouts, along the slots. Additional details regarding these phase-compensating features can be found in U.S. patent application Ser. No. 17/370,922 titled PHASE-COMPENSATED WAVEGUIDES AND RELATED SENSOR ASSEMBLIES, the entire contents of which are hereby incorporated by reference herein. Of course, these features need not be used in order to take advantage of the benefits of the inventive subject matter disclosed herein. Indeed, the antenna slots 120B (and/or 120A, for that matter) may be replaced with straight antenna slots, staggered slots (discussed below), antenna slots formed in a separate layer of the module/assembly 100, or any other suitable antenna structures.

Slots 120A and 120B are positioned on raised islands having elevated walls 117 that define a recessed region 116.

In the depicted embodiment, a raised lip 115 is also provided, which extends about the perimeter of the block 110 to define an exterior border the recessed region 116. Although the embodiment depicted in FIG. 2 includes a recessed region 116 defined by both raised islands for the antenna slots and an exterior raised lip 115, it is contemplated that other embodiments may comprise only raised islands without an exterior raised lip, or vice versa. Similarly, although providing a recessed region of some sort that is, as discussed below, configured to receive one or more additional layers, such as an absorptive layer, may be beneficial, it is also contemplated that some embodiments may lack a recessed region altogether.

As also shown in FIG. 2, an absorptive layer 140 is provided, preferably, as shown in the figure, directly against the preferably metallic material defining the block 110. By configuring this layer as described herein, improvements in RADAR sensor performance may be achieved. For example, by using preferred materials and/or thicknesses, layer 140 may be configured to serve as a metal-backed, non-reflective layer (MBNRL) for incoming radiation and/or may be configured to suppress surface currents on block 110 by absorbing energy from such currents and converting it into heat. This suppression of surface currents between the antennae of a sensor/module is believed to reduce or eliminate intra-antenna crosstalk. Some embodiments of such layers may also be useful in neutralizing the detrimental effect of strong reflections originating from vehicle fascia.

In preferred embodiments, the thickness of layer 140 may be about $(2n+1)$ quarter-wavelengths of the radiation used in the sensor in the medium (where $n=0, 1, 2, \ldots$). In this manner, for incoming radiation, layer 140 may effectively function as a non-reflective surface. Without being limited by theory, it is expected that the incoming radiation will undergo partial reflection from the top surface and the remaining radiation will pass through the medium and return after reflecting from the medium-metal interface. If both reflected signals are equal in strength and conditions have met them to have opposite phases, the reflected waves will cancel each other due to destructive interference.

Moreover, it is anticipated that this effect may extend well beyond the normal incidence angle. The broadest angular performance may be achieved with the thinnest solution ($n=0$). In preferred embodiments, the effect of one or more additional layers, such as a radome film layer, preferably on top of the sensor assembly/module, may also be taken into account. It should be understood that the thickness may be optimized for any azimuth incident angle, such as, for example, 20° or 45°, and that the corresponding thickness may then be configured to be suitable for a range of angles in the region of the defined azimuth angle. The thickness may further be optimized by considering non-zero elevation angles of incidence.

Layer 140 also comprises a series of openings for the various antenna slots, namely, openings 142 for each of the respective antenna slots 120A of the RX section and a single, wider opening 144 for each of the antenna slots 120B of the TX section. The use of a single opening 144 for each of the antenna slots 120B of the TX section is owed to the closer spacing of these antenna slots 120B, although separate openings may be used for each slot if desired. In embodiments, including the depicted embodiment, that include raised features, such as walls 117, preferably the openings are configured to fit within the recessed region 116 by extending about and at least substantially matching in shape each of the raised features (aside from the exterior lip 115, if present). In other words, preferably the layer 140 comprises a conformal shape to accommodate any particularities of the shape of the various antenna slots of the module 100. It is also contemplated that some embodiments may comprise an absorptive layer lacking in openings for the antenna slots.

In preferred embodiments, absorptive layer 140 may comprise a lossy material preferably having a dielectric constant of between about 6 and about 14. In some such embodiments, the dielectric constant may be between about 9 and about 14 or between about 6 and about 9. Some embodiments may comprise an absorptive layer having a dielectric constant of between about 6 and about 8.

In preferred embodiments, either in addition to having a preferred dielectric constant or instead of having a preferred dielectric constant, the absorptive layer 140 may comprise a material having a dielectric loss tangent of between about 0.2 and about 0.6. In some such embodiments, the dielectric loss tangent of the material may be between about 0.3 and about 0.6, or between about 0.2 and about 0.3.

The reason for providing two distinct nesting ranges for these material parameters is, without being limited by theory, thought to be due to whether considerations of broader azimuthal performance or stronger suppression of fascia reflections is preferred. For sensors with broader azimuthal performance, absorptive materials with a dielectric constant of between about 9 and about 14 and a dielectric loss tangent of between about 0.2 and about 0.3 may be preferable. However, a stronger suppression of fascia reflections at the expense of view angle may be achieved with absorptive materials having a dielectric constant of between about 6 and about 9 and a dielectric loss tangent of between about 0.3 and about 0.6. Moreover, it should be understood that, within a given design, either or both of these parameters may vary within about +/−20%.

In some embodiments, the absorptive layer 140 may comprise a carbon-loaded absorptive media, which may take the form of a plastic sheet, sticky adhesive tape, or liquid microwave absorber. Some such materials are available from, for example, Witcom Wittenburg Group (Netherlands), RTP (US), and Laird (US).

Another suitable group of materials for the absorptive materials in certain embodiments are paints for automotive and stealth applications which have metallic particles and/or hexagonal ferrite powder content. Some suitable Ba- and Sr-ferrite materials may have strong self-resonances at mm-waves. In some embodiments and related implementations of methods for manufacture, the absorptive material may be applied to the block 110 in liquid form, such as in some cases by pouring a controlled amount of liquid medium into the recessed region 116 on the upper surface of the housing/block 110. After curing, the formed MBNR/absorptive layer 140 will become an inseparable part of the housing/block.

Still another example of a material from which the absorptive layer 140 may be formed comprises a polypropylene material, preferably including a carbon material loaded therein, such as a carbon fiber material. A specific example of this material may be obtained from RTP Company in the form of pellets that can be rolled into thin sheets, in one specific example into sheets having a thickness of about 0.25 mm. A thin adhesive layer may be added to the sheet to create a laminate that can be stamped, laser cut, or otherwise formed into a desired shape. In some cases, the various openings 142/144 may also be stamped, laser cut, or otherwise formed into the sheet as well.

The depth of the recessed region 116 may also be important in certain embodiments. For example, in some embodiments, the depth of recessed region 116 on the top surface of the block 110 may be configured to level the top of the absorptive layer 140 and/or, in some cases, any layers above the absorptive layer, such as the radome layer 160, with that of the antenna plane containing the various antenna slots. Such dimensioning may prevent, or at least inhibit, the blockage of antenna radiation by lossy surroundings. In some applications, however, the absorptive layer 140 and/or any layers above may extend above the antenna plane to allow for beam pattern control.

The absorptive layer 140 may be maintained in its desired position by, for example, applying an adhesive or adhesive film to absorptive layer 140 or utilizing other known securing means.

In preferred embodiments, the upper/radome layer 160 lacks the openings of absorptive layer 140. Radome layer 160 may be, for example, adhered to the top of absorptive layer 140, preferably to cover and enclose the entire top surface and to make each of the antenna slots 120A/120B airtight.

In some embodiments, each of the various layers above the block/housing 110, which, as discussed below, may comprise two layers or more than two layers, may be laminated or otherwise combined together into a self-contained cap or seal for the assembly.

Figure 3:
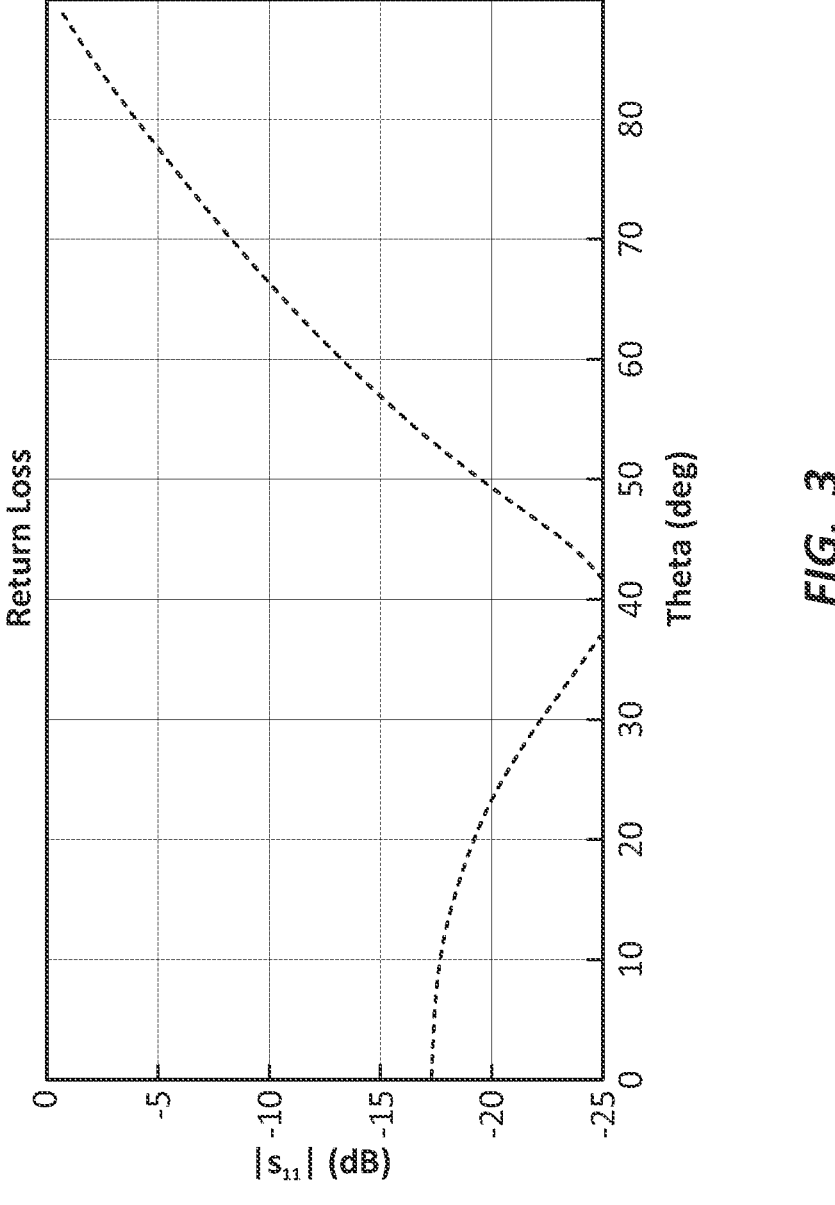
FIG. 3 is a graph depicting the return loss as a function of incident angle for a module incorporating an absorptive layer according to some embodiments.

FIG. 3 provides a graph that illustrates the return loss as a function of incident angle for an exemplary embodiment comprising an absorptive/MBNR layer having a thickness of about 0.35 mm and an upper layer (see layer 160 in FIG. 2, which is discussed in greater detail below) with a radome film having a thickness of about 0.2 mm as the top layer. This exemplary thickness may be used in a 76-81 GHz RADAR frequency band. Some embodiments may be configured for a 76 to 77 GHz RADAR and others for 77 to 81 GHz RADAR.

This figure illustrates how the return loss from stays below −17 dB over the incident angles up to 55 degrees, which covers virtually the entire operation range for a RADAR sensor. With the reflectivity reduced to −17 dB and below across such a wide range of incident angles, the particularities of fascia geometry and paint become unimportant, or at least less important. Thus, little to no modifications to the vehicle fascia are needed to accommodate the sensor.

Although the desired thickness of the absorptive/MBNR layer will typically vary according to the wavelength of electromagnetic radiation used in the sensor, the desired thickness of this layer may vary by about +/−15%. Thus, using the nominal value of 0.35 mm referenced above, thicknesses of between about 0.3 mm and about 0.4 mm may be suitable.

As was previously mentioned, there are thought to be two action mechanisms for the absorptive/MBNR layer. The first one is the reflection suppression mechanism which deals with the incident electromagnetic waves passing through and reflecting from the absorptive/MBNR layer. This mechanism relies upon specific, preferred thicknesses or thickness ranges (preferably close to odd multiples of quarter-wavelength of the associated radiation) for the absorptive layer to function as an MNBR layer. The second mechanism is one that acts to dissipate the surface currents as they propagate tangentially to the metallic surface of the sensor. This mechanism does not rely on any particular thickness for the layer. The final outcome in preferred embodiments is a result of the combined action of both of these mechanisms. As a result, the thickness requirement can, in certain embodiments, be substantially relaxed to accommodate to possible MNBR production variations.

Figure 4:
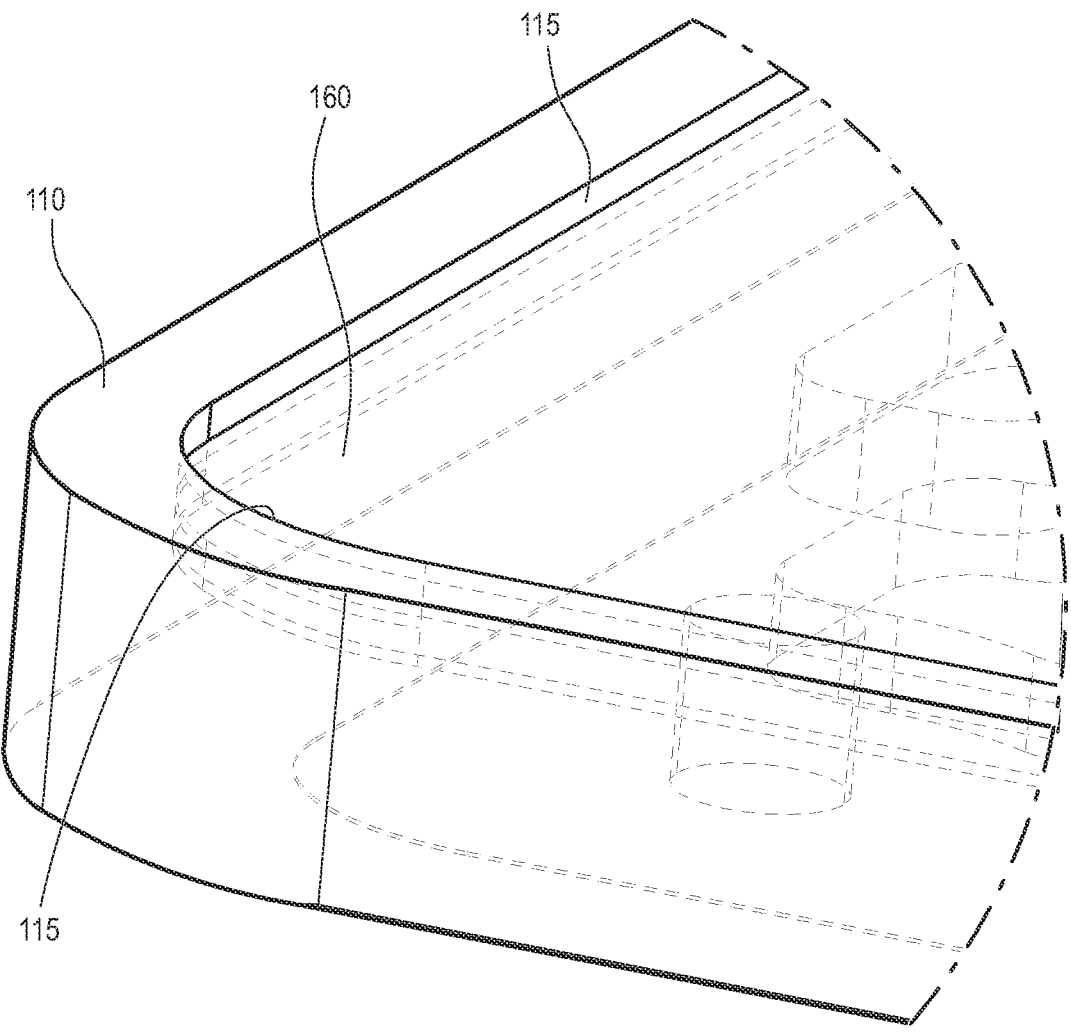
FIG. 4 is an enlarged, perspective view of a corner of the antenna/waveguide assembly.

In some embodiments comprising an exterior lip 115, the lip may extend slightly above the upper-most layer of the assembly 100 above the block/housing 110. This can be seen in FIG. 4, which is an enlarged, perspective view of one corner of the assembly 100. As better seen in this figure, in some embodiments, the lip 115 may extend slightly above the top surface of the uppermost layer of the assembly 100, which in this case is radome layer 160. This may provide protection to the various layers that sit within the recessed region 116 or otherwise sit within the portion of the assembly 100 positioned internally of the lip 115. In some embodiments, the height of the lip 115 may be between about 0.2 mm and about 0.6 mm above the upper surface of radome layer 160. In some such embodiments, the height of the lip 115 may be about 0.4 mm above the upper surface of radome layer 160.

Figure 5:
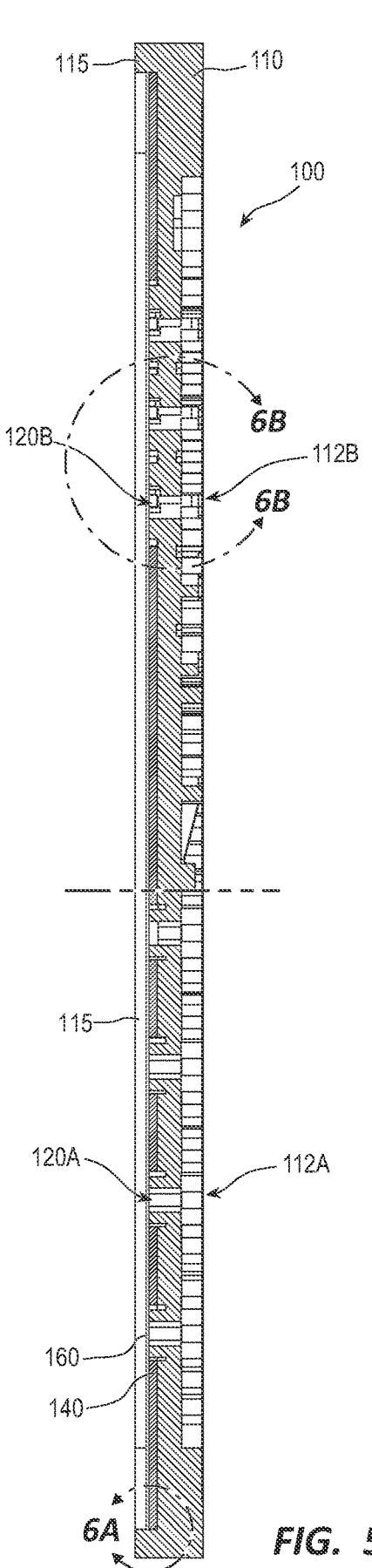
FIG. 5 is a cross-sectional view taken along line 5-5 in FIG. 1.

FIG. 5 is a cross-sectional view illustrating how the waveguide grooves 112A/112B are aligned, at least in part, with a corresponding antenna slot 120A/120B. Although in the depicted embodiment both the waveguide grooves and antenna slots are formed in the same block/structure 110, it is contemplated that such elements may be provided in separate elements and/or layers in other embodiments. For example, in some embodiments, a slotted layer may be coupled with a block, casting, and/or other element comprising waveguide grooves. Such slotted layer may comprise one or more rows of slots in some embodiments, which may correspond in number and/or location with the waveguide(s) partially defined by block 110. When present, this slotted layer may be applied to the absorptive layer and/or any other layers of the assembly 100, in some cases by way of a composite lamination.

Figure 6A:
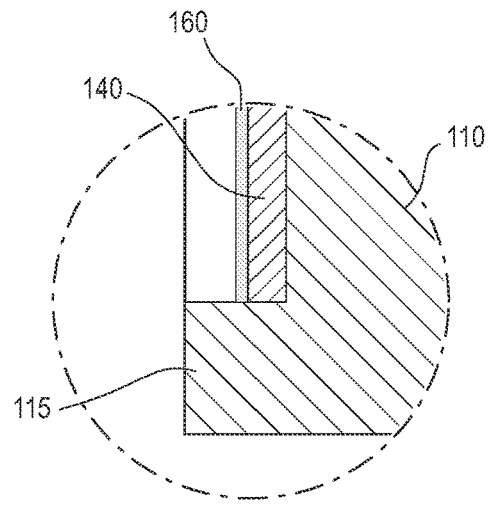
FIG. 6A is an enlarged, cross-sectional view taken along the indicated region from FIG. 5.
Figure 6B:
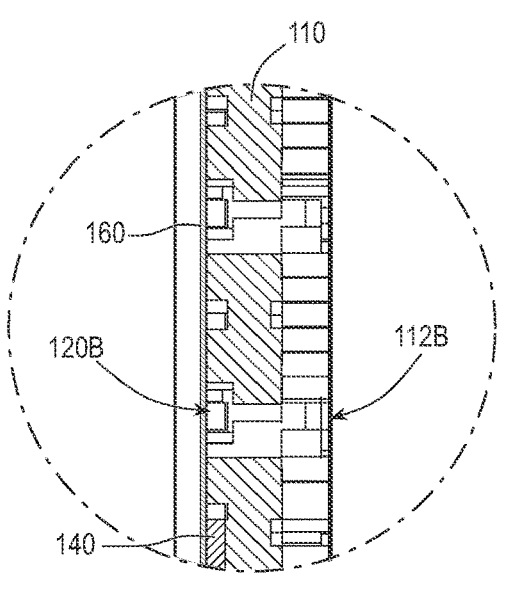
FIG. 6B is another enlarged, cross-sectional view taken along the indicated region from FIG. 5.

The configuration of the lip 115 along the perimeter of the block 110 relative to the layers 140 and 160 is better seen in FIG. 6A. Similarly, the interrelationship between a particular waveguide/antenna slot pair 112B/120B, along with the layers 140/160, including the opening 144 formed in layer 140, can be best seen in the enlarged view of FIG. 6B.

Figure 7:
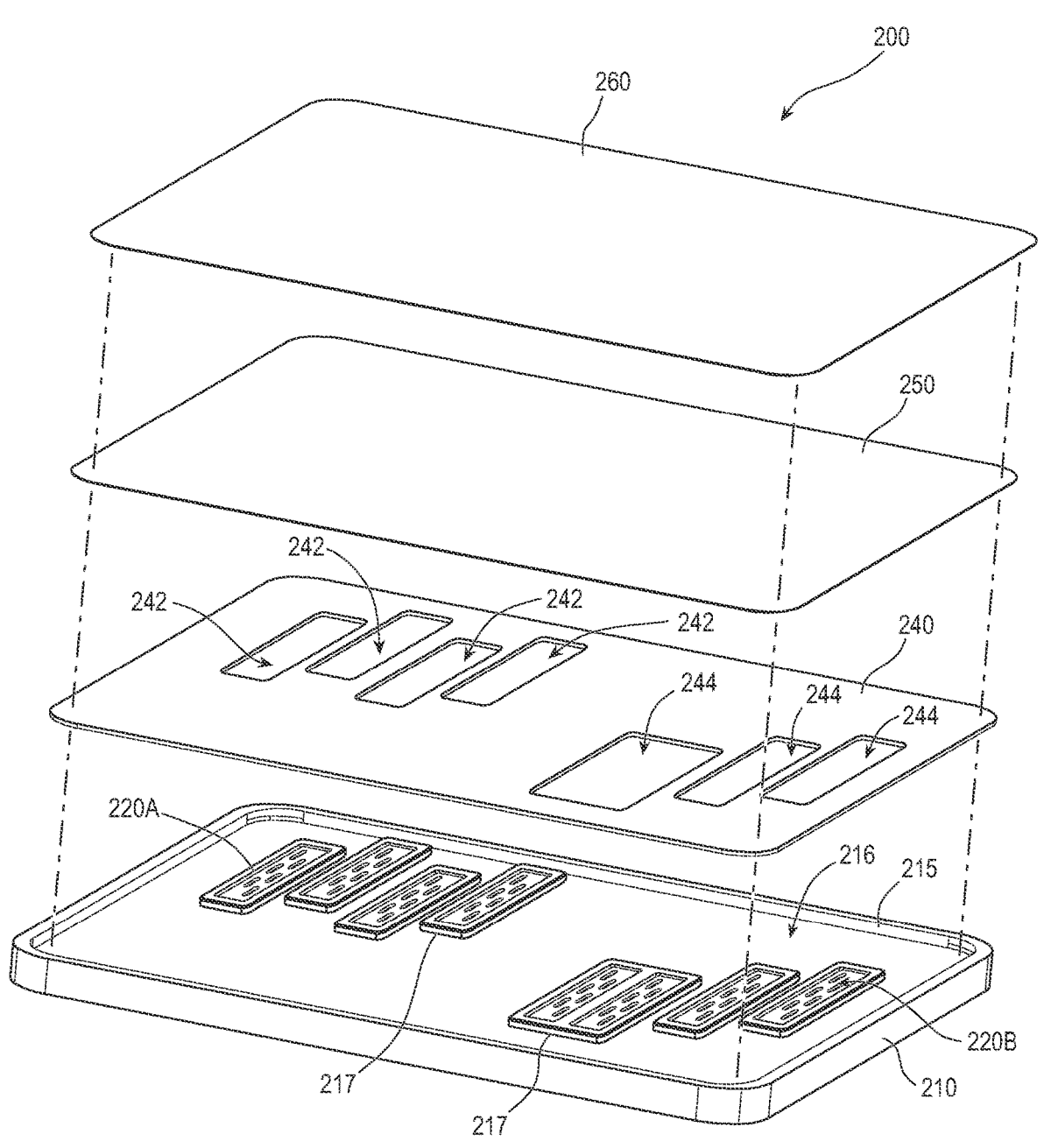
FIG. 7 is an exploded, perspective view of an antenna/waveguide assembly according to other embodiments.

An alternative embodiment of a module 200 for a sensor assembly, such as a RADAR sensor assembly for a vehicle, is shown in FIG. 7. Module 200 again comprises a block 210 that may define, either in whole or in part, one or more waveguides and/or one or more antennae. Although the waveguide portion of block 210 is not depicted in FIG. 7, this portion may be defined by a plurality of posts arranged to define one or more waveguide grooves therebetween, as with block 110. Or, as previously mentioned, the waveguide portion of block 210 may be defined in other ways, such as by way of trench-style waveguides having continuous walls, or any other waveguide available to those of ordinary skill in the art.

As with block 110, block 210 may comprise two functional sets of waveguides, one an RX section and one a TX section. The antenna sides of these functional waveguide sections are depicted in FIG. 7. This embodiment, however, differs from block 110 in that the antenna slots are arranged in arrays having staggered slots. Thus, arrays 220A each comprises a plurality of antenna slots extending in two rows offset with respect to one another. As also shown in FIG. 7, some of the arrays themselves may be offset with respect to one another. Similarly, arrays 220B may comprise staggered antenna slots extending in two offset rows. As with block 110, each of the arrays 220A/220B of block 210 may be positioned to extend above the floor of the block 210 with elevated walls 217 that define a recessed region 216.

Figure 8:
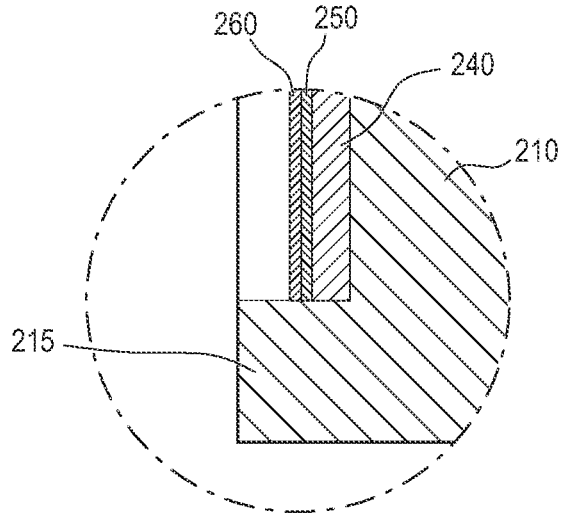
FIG. 8 is an enlarged, cross-sectional view of the antenna/waveguide assembly of FIG. 7.

In the depicted embodiment, a raised lip 215 is also provided, which extends about the perimeter of the block 210 to define an exterior border the recessed region 216, which is also depicted in the enlarged, cross-sectional view of FIG. 8. Although the embodiment depicted in FIG. 7 includes a recessed region 216 defined by both raised islands (formed by walls 217) for the antenna slot arrays and an exterior raised lip 215, it is contemplated that other embodiments may comprise only raised islands without an exterior raised lip, or vice versa. Similarly, although providing a recessed region of some sort that is, as discussed above, configured to receive one or more additional layers, such as an absorptive layer, may be beneficial, it is also contemplated that some embodiments may lack a recessed region altogether.

As also shown in FIG. 7, an absorptive layer 240 is provided, preferably, as shown in the figure, directly against the preferably metallic material defining the block 210. As previously mentioned, by using preferred materials and/or thicknesses, layer 240 may be configured to serve as a metal-backed, non-reflective layer (MBNRL) for incoming radiation and/or may be configured to suppress surface currents on block 210 by absorbing energy from such currents and converting it into heat. This suppression of surface currents between the antennae of a sensor/module may also reduce or eliminate intra-antenna crosstalk and/or may be useful in neutralizing or at least reducing the detrimental effect of strong reflections originating from vehicle fascia.

In preferred embodiments, the thickness of layer 240 may be about $(2n+1)\frac{1}{4}$ wavelengths of the radiation used in the sensor in the medium (where n=0, 1, 2, . . . ). In this manner, for incoming radiation, layer 240 may effectively function as a non-reflective surface.

Layer 240 may further comprise a series of openings for the various antenna slots arrays, namely, openings 242 for each of the respective antenna slot arrays 220A of the RX section and a series of corresponding openings 244 for each of the antenna slot arrays 220B of the TX section. As shown in FIG. 7, one or more of these openings 242/244 may be configured to accommodate more than one array of antenna slots.

In embodiments, including the depicted embodiment, that include raised features, such as walls 217, preferably the aforementioned openings in layer 240 are configured to fit within the recessed region 216 by extending about and at least substantially matching in shape each of the raised features (aside from the exterior lip 215 in some embodiments, if present). It is also contemplated that some embodiments may comprise an absorptive layer lacking in openings for the antenna slot arrays.

In preferred embodiments, absorptive layer 240 may comprise a lossy material preferably having a dielectric constant of between about 6 and about 14. In some such embodiments, the dielectric constant may be between about 9 and about 14 or between about 6 and about 9. In preferred embodiments, either in addition to having a preferred dielectric constant or instead of having a preferred dielectric constant, the absorptive layer 240 may comprise a material having a dielectric loss tangent of between about 0.2 and about 0.6. In some such embodiments, the dielectric loss tangent of the material may be between about 0.3 and about 0.6, or between about 0.2 and about 0.3. Moreover, it should be understood that, within a given design, either or both of these parameters may vary within about +/−20%.

In some embodiments, the absorptive layer 240 may comprise a carbon-loaded absorptive media, which may take the form of a plastic sheet, sticky adhesive tape, or liquid microwave absorber. Another suitable material for absorptive layer comprises paint for automotive and stealth applications that have metallic particles and/or hexagonal ferrite powder content, such as Ba- and Sr-ferrite materials. In some embodiments and related implementations of methods for manufacture, the absorptive material may be applied to the block 210 in liquid form, such as in some cases by pouring a controlled amount of liquid medium into the recessed region 216 on the upper surface of the housing/block 210. After curing, the formed MBNR/absorptive layer will become an inseparable part of the housing/block.

Still another example of a material from which the absorptive layer 240 may be formed comprises a polypropylene material, preferably including a carbon material loaded therein, such as a carbon fiber material. A specific example of this material may be obtained from RTP Company in the form of pellets that can be rolled into thin sheets, in one specific example into sheets having a thickness of about 0.25 mm. A thin adhesive layer may be added to the sheet to create a laminate that can be stamped, laser cut, or otherwise formed into a desired shape. In some cases, the various openings 242/244 may also be stamped, laser cut, or otherwise formed into the sheet as well.

Assembly 200 further comprises a top layer 260, which may be used to provide a radome or liquid/weather seal to the assembly 200. Thus, in some embodiments, layer 260 may comprise a plastic film or other non-conductive material. In some such embodiments, layer 260 may comprise an adhesive plastic film. However, alternatively, layer 260 may be applied by use of a separate adhesive or other coupling means. Preferably, layer 260 applies a waterproof seal to assembly 200, or at least a portion thereof, to protect the unit from damage, which may allow assembly 200 to be mounted to the exterior of a vehicle.

However, unlike assembly 100, assembly 200 further comprises an additional layer 250. In some embodiments, layer 250 may comprise an adhesive layer configured to adhere the radome layer 260 to the absorptive layer 240. Such an adhesive layer may comprise, for example, an adhesive tape, such as a conductive adhesive tape, or another suitable material. Although not shown with openings, in some embodiments, layer 250 may comprise openings that correspond with and/or are aligned, at least in part, with the aforementioned openings. In addition, layer 250 may be positioned at another location in the assembly 200, or an additional adhesive layer or other layer may be present, if desired.

In some embodiments and related manufacturing methods, a sub-assembly comprising a plurality of layers forming a self-contained weather seal or "sticker" may be provided. For example, all three of layers 240, 250, and 260 may be formed during manufacturing in a sandwiched configuration that may be simply applied to the top of the antenna block 210 by use of an adhesive. In some such embodiments, the adhesive may be part of the sandwich assembly so that the weather seal assembly may be applied to antenna block 210 similar to a sticker. Again, in some embodiments, less than all of the layers depicted in FIG. 7 or, in other embodiments, additional layers, may be included in this weather seal/sticker assembly.

Any of the various layers, such as layer 240 may be coupled with block 210 in a variety of possible ways. For example, an adhesive, solder, heat stakes, screws, other fasteners, and the like may be used. In some embodiments, another layer, such as a layer of adhesive tape, may be inserted in between any of the various layers, which may, either entirely or in part, be used to provide this coupling.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle sensor module, comprising:
a waveguide block defining an array of waveguide grooves;
an array of antenna slots, each antenna slot in the array of antenna slots at least partially aligned with a waveguide groove of the array of waveguide grooves of the waveguide block, wherein each antenna slot of the array of antenna slots extends from a first side of the waveguide block to a second side of the waveguide block to allow electromagnetic radiation to travel through the array of antenna slots;
an absorptive layer comprising an array of openings corresponding with the array of antenna slots, wherein the absorptive layer is configured to suppress surface currents on the waveguide block;
a radome layer positioned on top of the absorptive layer, wherein the radome layer lacks openings so as to provide a seal for the waveguide block, wherein at least a subset of the antenna slots is positioned on raised islands comprising elevated walls extending above a recessed region, and wherein the absorptive layer is positioned within the recessed region; and
a raised lip extending about a perimeter of the waveguide block, wherein the radome layer is positioned within the recessed region and below the raised lip, and wherein the radome layer and the absorptive layer are positioned adjacent to each other within a recessed region of the waveguide block.

2. The vehicle sensor module of claim 1, wherein the radome layer comprises a laminated layer comprising a plurality of sub-layers, wherein at least one of the sub-layers is configured to adhere the radome layer to the absorptive layer, and wherein at least one of the sub-layers is configured to increase a strength of the radome layer.

3. The vehicle sensor module of claim 1, wherein the array of waveguide grooves comprises a plurality of waveguide grooves.

4. The vehicle sensor module of claim 1, wherein the absorptive layer has a thickness equal to about an odd integer multiple of one-quarter of a wavelength of electromagnetic radiation used in the vehicle sensor module.

5. The vehicle sensor module of claim 1, wherein the absorptive layer comprises a lossy material.

6. The vehicle sensor module of claim 5, wherein the absorptive layer comprises a material having a dielectric constant of between 6 and 14 and a dielectric loss tangent of between 0.2 and 0.6.

7. A vehicle sensor antenna assembly, comprising:
a metallic waveguide block defining an array of waveguide grooves;
an antenna assembly comprising at least one antenna slot configured to receive electromagnetic radiation from the array of waveguide grooves therethrough; and
an absorptive layer configured to generate a destructive interference pattern to reduce reflectivity of the electromagnetic radiation incident upon the vehicle sensor antenna assembly, wherein the antenna assembly is part of the metallic waveguide block such that the at least one antenna slot is formed within the metallic waveguide block and extends between opposite surfaces of the metallic waveguide block, wherein the metallic waveguide block comprises a recessed region, wherein the absorptive layer is positioned within the recessed region, wherein the recessed region is defined by a lip extending about a perimeter of the metallic waveguide block and elevated walls extending about the perimeter of each antenna slot of the at least one antenna slot, and wherein the recessed region comprises a height that is more than a thickness of the absorptive layer.

8. The vehicle sensor antenna assembly of claim 7, wherein the antenna assembly comprises an antenna slot corresponding to each waveguide groove of the array of waveguide grooves.

9. The vehicle sensor antenna assembly of claim 7, wherein the absorptive layer comprises one or more openings positioned such that each antenna slot of the at least one antenna slot is positioned below an opening of the one or more openings.

10. The vehicle sensor antenna assembly of claim 7, wherein the absorptive layer comprises a dielectric constant of between about 6 and about 14.

11. The vehicle sensor antenna assembly of claim 7, wherein the absorptive layer comprises a dielectric loss tangent of between about 0.2 and about 0.6.

12. The vehicle sensor antenna assembly of claim 7, further comprising a radome layer positioned within the recessed region.

13. The vehicle sensor antenna assembly of claim 7, further comprising a radome layer, wherein the recessed region comprises a height that is greater than a thickness of the absorptive layer and the radome layer combined.

14. A vehicle RADAR module, comprising:
a metallic waveguide block defining a waveguide groove and comprising a recessed region;
an antenna slot at least partially aligned with the waveguide groove of the metallic waveguide block, wherein the antenna slot extends entirely through the metallic waveguide block from a first surface of the metallic waveguide block to a second surface of the metallic waveguide block opposite the first side to allow electromagnetic radiation to travel therethrough;
an absorptive layer seated in the recessed region, the absorptive layer comprising a lossy material, wherein the absorptive layer comprises an opening at least partially aligned with the antenna slot and the waveguide groove, wherein the absorptive layer is configured to contact the metallic waveguide block to suppress surface currents on the metallic waveguide block, and wherein the absorptive layer comprises a thickness configured to suppress reflections of the electromagnetic radiation by generating destructive interference between reflections of the electromagnetic radiation above the absorptive layer with reflections of the electromagnetic radiation below the absorptive layer; and a radome layer configured to provide a weather seal to the vehicle RADAR module, wherein the radome layer is seated in the recessed region, wherein the recessed region is defined by a lip extending about a perimeter of the metallic waveguide block, and wherein the recessed region comprises a height that is more than a thickness of the absorptive layer.

15. The vehicle RADAR module of claim 14, wherein the absorptive layer has a thickness equal to about an odd integer multiple of one-quarter of a wavelength of electromagnetic radiation used in the vehicle RADAR module.

16. The vehicle RADAR module of claim 14, wherein the absorptive layer is formed from a liquid cured within the recessed region of the metallic waveguide block.

17. The vehicle RADAR module of claim 14, wherein the recessed region comprises a height that is greater than a thickness of the absorptive layer and the radome layer combined.

* * * * *